US010200269B2

United States Patent
Sato et al.

(10) Patent No.: US 10,200,269 B2
(45) Date of Patent: Feb. 5, 2019

(54) INFORMATION GENERATION METHOD USING WRITE SPEED OF DATA TO STORAGE DEVICE, INFORMATION GENERATION DEVICE USING WRITE SPEED OF DATA TO STORAGE DEVICE, AND NON-TRANSITORY RECORDING MEDIUM FOR STORING INFORMATION GENERATION PROGRAM USING WRITE SPEED OF DATA TO STORAGE DEVICE

(71) Applicant: FUJITSU LIMITED, Kawasaki-shi, Kanagawa (JP)

(72) Inventors: Mitsuhiro Sato, Kawasaki (JP); Daisuke Fujita, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 178 days.

(21) Appl. No.: 15/358,628

(22) Filed: Nov. 22, 2016

(65) Prior Publication Data

US 2017/0289006 A1 Oct. 5, 2017

(30) Foreign Application Priority Data

Mar. 31, 2016 (JP) .................................. 2016-072819

(51) Int. Cl.
*H04L 12/26* (2006.01)
*H04L 12/707* (2013.01)
*H04L 29/08* (2006.01)

(52) U.S. Cl.
CPC .......... *H04L 43/10* (2013.01); *H04L 43/0888* (2013.01); *H04L 43/16* (2013.01); *H04L 67/1097* (2013.01); *H04L 45/22* (2013.01)

(58) Field of Classification Search
CPC ............................... H04L 43/10; H04L 45/22
See application file for complete search history.

(56) References Cited

U.S. PATENT DOCUMENTS

| 2003/0169688 | A1* | 9/2003 | Mott ....................... H04L 47/11 370/230 |
| 2004/0019686 | A1 | 1/2004 | Toyoda et al. |
| 2007/0025301 | A1* | 2/2007 | Petersson ................ H04L 47/10 370/338 |
| 2011/0299408 | A1* | 12/2011 | Gunawardena ....... H04W 72/06 370/252 |
| 2013/0242745 | A1 | 9/2013 | Umezuki |
| 2014/0019970 | A1 | 1/2014 | Okamoto |

FOREIGN PATENT DOCUMENTS

| JP | 2004-56728 A | 2/2004 |
| JP | 2006-318020 A | 11/2006 |
| JP | 2013-197868 A | 9/2013 |
| WO | 2012/132808 A1 | 10/2012 |

* cited by examiner

*Primary Examiner* — Shirley X Zhang
(74) *Attorney, Agent, or Firm* — Westerman, Hattori, Daniels & Adrian, LLP

(57) ABSTRACT

An information generation method includes: obtaining, for respective communication paths included in the communication paths, a write speed of data received through the respective communication paths to a storage device and a reception speed of the data, by a computer; generating first information on a transmission speed of the data for the respective communication paths, based on the write speed and the reception speed; and transmitting the first information to a transmission source device of the data with second information for identifying the respective communication paths.

20 Claims, 7 Drawing Sheets

INFORMATION GENERATION METHOD USING WRITE SPEED OF DATA TO STORAGE DEVICE, INFORMATION GENERATION DEVICE USING WRITE SPEED OF DATA TO STORAGE DEVICE, AND NON-TRANSITORY RECORDING MEDIUM FOR STORING INFORMATION GENERATION PROGRAM USING WRITE SPEED OF DATA TO STORAGE DEVICE

CROSS-REFERENCE TO RELATED APPLICATION

This application is based upon and claims the benefit of priority of the prior Japanese Patent Application No. 2016-072819, filed on Mar. 31, 2016, the entire contents of which are incorporated herein by reference.

FIELD

The embodiments discussed herein are related to an information generation method, an information generation device, and a non-transitory recording medium for recording an information generation program.

BACKGROUND

When an information processing device transmits data to another information processing device through a network, the transmission is controlled based on a communication speed of the network.

Technologies in the related art are disclosed in Japanese Laid-open Patent Publication No. 2006-318020, Japanese Laid-open Patent Publication No. 2013-197868, International Publication Pamphlet No. WO2012/132808, or Japanese Laid-open Patent Publication No. 2004-56728.

SUMMARY

According to an aspect of the embodiments, an information generation method includes: obtaining, for respective communication paths included in the communication paths, a write speed of data received through the respective communication paths to a storage device and a reception speed of the data, by a computer; generating first information on a transmission speed of the data for the respective communication paths, based on the write speed and the reception speed; and transmitting the first information to a transmission source device of the data with second information for identifying the respective communication paths.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In transmitting data between information processing devices through a network, a transmission speed of the data is controlled, for example, based on a vacant band of the network.

For example, with regard to data replication, when updating frequency of a master database is high, desynchronization in the replication is suppressed by accumulating the difference data over a certain period of time in batch files and transmitting them in block to a sub system.

For example, when an occurrence of data congestion is detected in a first path between adjacent L2 switches, a second path is selected. The bandwidth is utilized effectively, as an L2 switch adjacent to the transmission source, through an L2 switch that is adjacent through the second path, is notified to the effect that the second path is used as an alternative path.

For example, a client terminal is connected to a server running a virtual machine which is less affected by a delay in the communication line, by transferring a virtual machine to the server running a virtual machine located at the nearest location derived from the position coordinate information of a client terminal.

For example, when an access request to a remote storage device is generated, a bandwidth control parameter value that conforms to a transfer data size indicated in the access request is obtained from a table that stores bandwidth control parameter values that correspond to data sizes in advance. Therefore, the path with an optimum bandwidth is dynamically established.

For example, when a transmission speed of data is controlled based on vacant bands of a network, the data transfer speed may decrease. For example, in a file transfer, when a write speed of data to a storage device on the receiving side is slow, an information processing device on the receiving side is not adequately capable of processing the received data, thereby decreasing data transfer speed.

Figure 1:
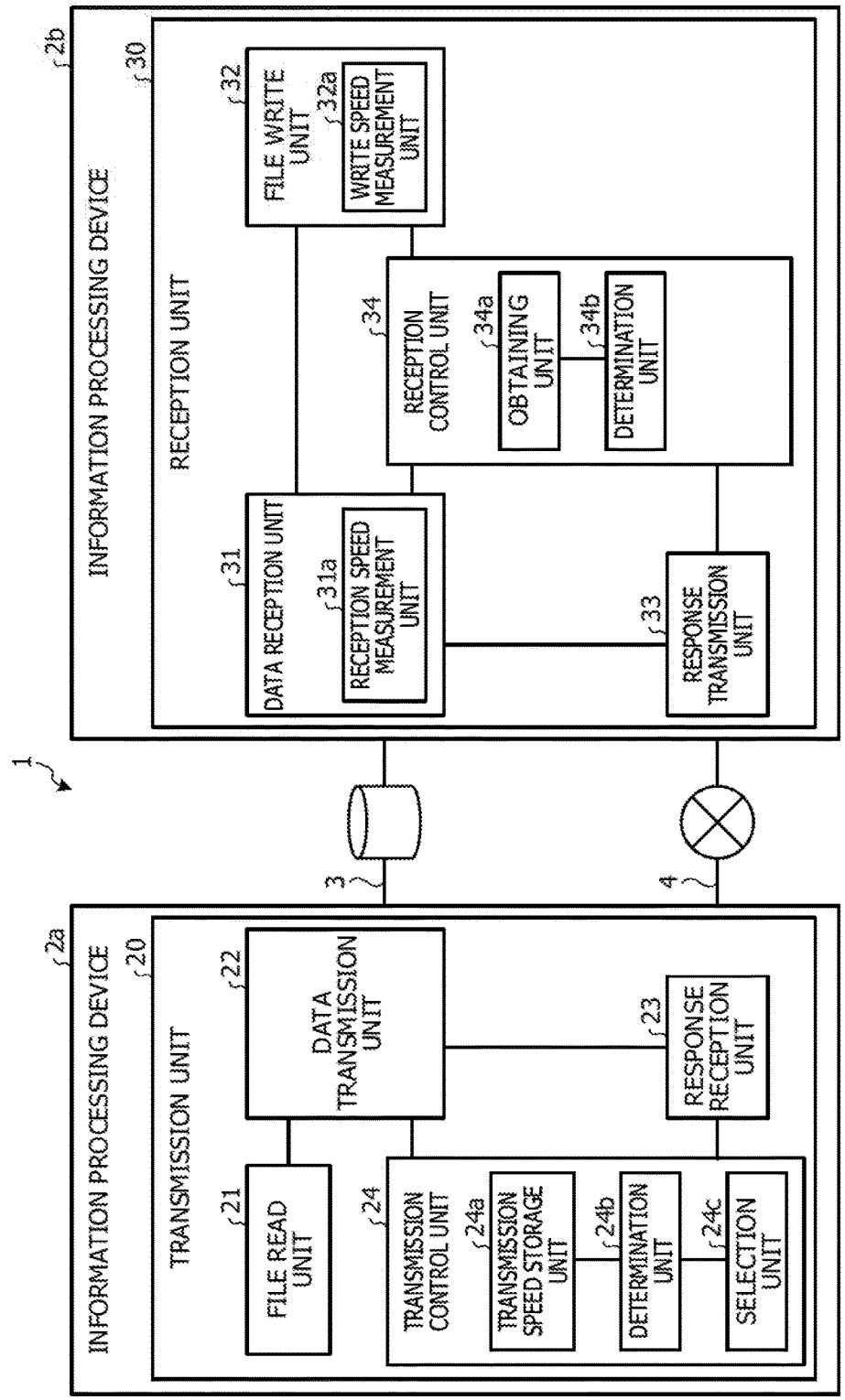
FIG. 1 illustrates an example of a file transfer system.

FIG. 1 illustrates an example of a file transfer system. As illustrated in FIG. 1, a file transfer system 1 includes an information processing device 2a that transmits a file and an information processing device 2b that receives a file. The information processing device 2a is connected to the information processing device 2b through a storage area network (SAN) 3 and a local area network (LAN) 4.

The information processing device 2a includes a transmission unit 20 that reads a file from a hard disk drive (HDD) and transmits the read file to the information processing device 2b through the SAN 3 or the LAN 4. The information processing device 2b includes a reception unit 30 that writes the file transmitted from the information processing device 2a through the SAN 3 or the LAN 4, to an HDD.

For example, the information processing device 2a may transfer a file to the information processing device 2b, and the information processing device 2b may transfer a file to the information processing device 2a. The information processing device 2a may include the reception unit 30, and the information processing device 2b may include the transmission unit 20.

The transmission unit 20 includes a file read unit 21, a data transmission unit 22, a response reception unit 23, and a transmission control unit 24. The file read unit 21 reads data in the file from the HDD and passes the data to the data transmission unit 22.

The data transmission unit 22 divides the data transferred from the file read unit 21, to packets and transmits the packets to the information processing device 2b through the SAN 3 or the LAN 4. Which of the SAN 3 or the LAN 4 is to be used to transmit the packets is specified by the transmission control unit 24. The transmission speed is also specified by the transmission control unit 24. For example, the data transmission unit 22 transmits the packets at the transmission speed and through the network specified by the transmission control unit 24.

Figure 2:
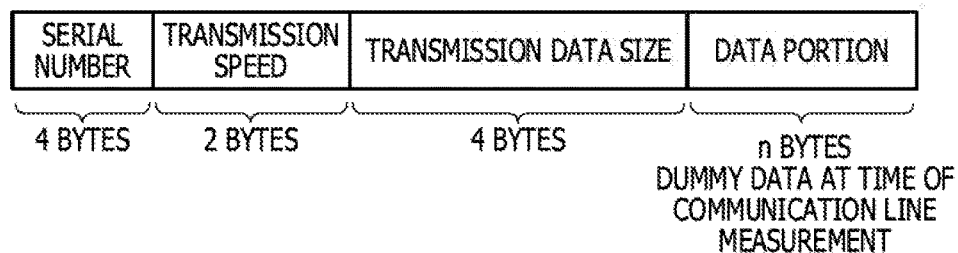
FIG. 2 illustrates an example of a format of a packet.

FIG. 2 illustrates an example of a format of a packet. The packet illustrated in FIG. 2 may be transmitted by the data transmission unit 22. As illustrated in FIG. 2, the packet transmitted by the data transmission unit 22 includes a serial number, transmission speed, transmission data size, and a data portion.

The serial number is a sequence number used to identify a packet, and has, for example, the size of four bytes. The transmission speed is the speed at which the packet is transmitted, and has, for example, the size of two bytes. The transmission data size is the number of bytes of the transmitted data, and has, for example, the size of four bytes.

The data portion is the transmitted data, and the size is, variable length. At the time of measurement of the communication speed, dummy data is input to the data portion. The data transmission unit 22 transmits a communication line measurement packet including the dummy data to the information processing device 2b in order to measure the communication speed of the SAN 3 or the LAN 4 based on an instruction of the transmission control unit 24.

Figure 3:
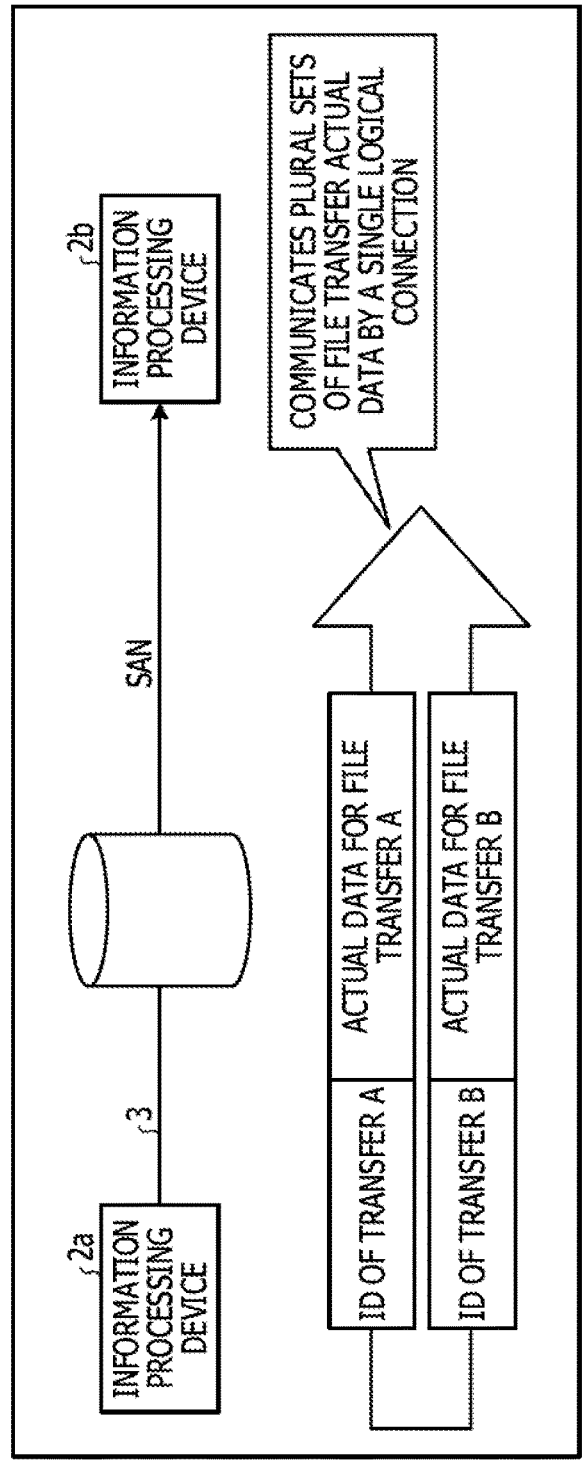
FIG. 3 illustrates an example of data transmission.

When the data transmission unit 22 is instructed by the transmission control unit 24 to transfer plural files through the SAN 3, the data transmission unit 22 transmits data for transferring the plural files by a single logical connection. FIG. 3 illustrates an example of data transmission. In FIG. 3, a case in which the plural files are transferred by a single logical connection of the SAN 3 is illustrated.

As illustrated in FIG. 3, the data transmission unit 22 transmits plural files by a single logical connection by adding respective IDs to the actual data for identifying the file transfer. The actual data is data read from the files to be transferred.

In FIG. 1, the response reception unit 23 receives a response packet responding to the packet transmitted from the data transmission unit 22, from the information processing device 2b, and passes the response packet to the transmission control unit 24. The response reception unit 23 receives the response packet using the same network as the network the data transmission unit 22 used for the transmission.

Figure 4:
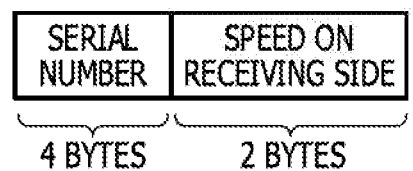
FIG. 4 illustrates an example of a format of a response packet.

FIG. 4 illustrates an example of a format of a response packet. As illustrated in FIG. 4, the response packet includes a serial number and the speed on the receiving side. The serial number is a sequence number for identifying a packet, and is, for example, the size of four bytes. The response reception unit 23 transfers the serial number included in the response packet to the data transmission unit 22, and the data transmission unit 22 generates a serial number of a packet to be transmitted, based n the serial number received from the response reception unit 23.

The speed on the receiving side is the speed at which the information processing device 2b receives data and is capable of writing to a file, and has, for example, the size of two bytes. The speed on the receiving side is specified by the information processing device 2b based on the speed of the communication path and the write speed to the file.

The transmission control unit 24 determines transmission speed, based on the speed on the receiving side included in the response packet. The transmission control unit 24 determines transmission speed of the SAN 3 and transmission speed of the LAN 4 respectively, and determines which of the SAN 3 or the LAN 4 to use as the communication path, based on the two determined transmission speeds. The transmission control unit 24 includes a transmission speed storage unit 24a, a determination unit 24b, and a selection unit 24c.

The transmission speed storage unit 24a stores a transmission speed determined by the determination unit 24b. The transmission speed storage unit 24a stores each of the transmission speed of the SAN 3 and the transmission speed of the LAN 4.

The determination unit 24b compares the speed on the receiving side, which is included in the response packet received from the response reception unit 23, and the transmission speed stored in the transmission speed storage unit 24a, and, when the speed on the receiving side is lower than the transmission speed, determines the speed on the receiving side as the new transmission speed. The determination unit 24b stores in the transmission speed storage unit 24a, and notifies to the data transmission unit 22, the determined transmission speed.

The determination unit 24b determines a transmission speed in the SAN 3 on receiving from the response reception unit 23 a response packet received through the SAN 3, and determines a transmission speed in the LAN 4 on receiving from the response reception unit 23 a response packet received through the LAN 4. The determination unit 24b determines an initial value of the transmission speed, for example, by transmitting a communication line measurement packet to the data transmission unit 22.

The selection unit 24c selects a network for transferring a file, based on the transmission speeds determined with respect to the SAN 3 and the LAN 4 by the determination unit 24b, and notifies the data transmission unit 22 of the selected network. The selection unit 24c selects, as the network for transferring a file, for example, the network with a faster transmission speed at the start of a file transfer, out of the SAN 3 and the LAN 4.

The reception unit 30 includes a data reception unit 31, a file write unit 32, a response transmission unit 33, and a reception control unit 34. The data reception unit 31 receives a packet that the data transmission unit 22 transmitted through the SAN 3 or the LAN 4, and passes the packet to the file write unit 32. When plural files have been transferred by a single logical connection, the data reception unit 31 passes data for each of the files to the file write unit 32.

The data reception unit 31 notifies the reception control unit 34 as to whether or not the received packet is a communication line measurement packet. The data reception unit 31 notifies the response transmission unit 33 of a serial number included in the received packet.

The data reception unit 31 includes a reception speed measurement unit 31a. The reception speed measurement unit 31a measures the reception speed of a network through which the packet has been received, and passes the measured reception speed to the reception control unit 34.

The file write unit 32 extracts data from a data portion of the packet received from the data reception unit 31, and writes the extracted data to a file on the HDD. The file write unit 32 includes a write speed measurement unit 32a. The write speed measurement unit 32a calculates a write speed from the file writing time and the amount of data written, and passes the write speed to the reception control unit 34.

The response transmission unit 33 generates a response packet, based on the serial number notified from the data reception unit 31 and the speed on the receiving side notified from the reception control unit 34, and transmits the response packet to the information processing device 2a. The response transmission unit 33 transmits the response packet using the network through which the data reception unit 31 has received the packet.

The reception control unit 34 calculates, and notifies to the response transmission unit 33, the speed on the receiving side of the network through which the data reception unit 31 has received the packet. The reception control unit 34 includes an obtaining unit 34a and a determination unit 34b. The obtaining unit 34a obtains the reception speed measured by the reception speed measurement unit 31a and the write speed measured by the write speed measurement unit 32a.

When the data reception unit 31 has received a communication line measurement packet, the determination unit 34b determines that the reception speed obtained by the obtaining unit 34a is the speed on the receiving side to be included in the packet, and notifies the determined reception speed to the response transmission unit 33.

When the data reception unit 31 has received an actual packet including actual data, the determination unit 34b compares the reception speed and the write speed that have been obtained by the obtaining unit 34a, and determines the reception speed is the speed on the receiving side to be included in the packet, when the reception speed is lower than the write speed. The determination unit 34b notifies the response transmission unit 33 of the speed on the receiving side. When the reception speed is not lower than the write speed, the determination unit 34b determines the write speed is the speed on the receiving side to be included in the packet, and notifies the response transmission unit 33 of the determined speed on the receiving side.

Figure 5:
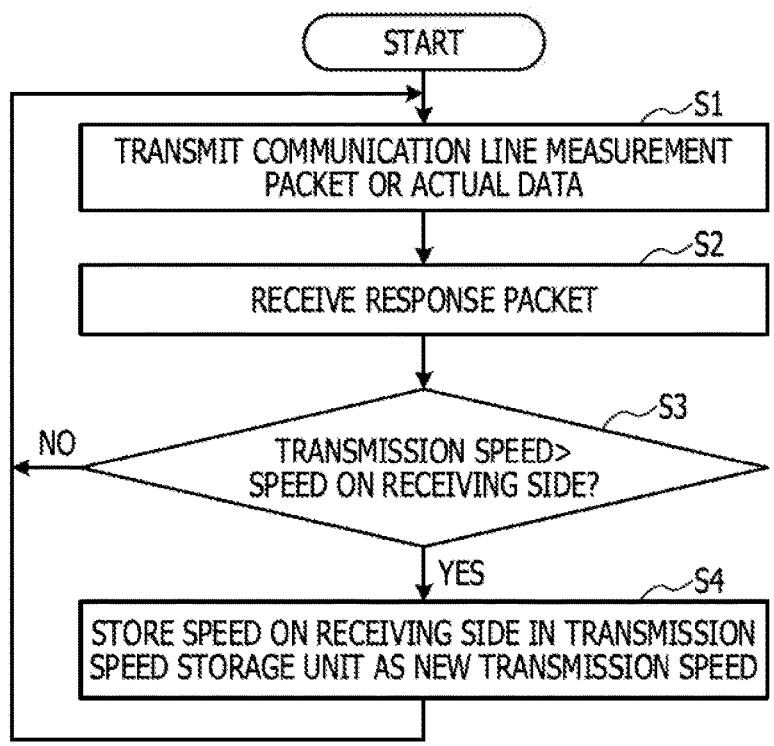
FIG. 5 illustrates an example of transmission processing in a transmission unit.

FIG. 5 illustrates an example of transmission processing of a transmission unit. The transmission unit may be the transmission unit 20 illustrated in FIG. 1. As illustrated in FIG. 5, the transmission unit 20 transmits a communication line measurement packet or actual data (Operation S1).

The transmission unit 20 receives a response packet that has been transmitted in response to the transmitted communication line measurement packet or actual data by the reception unit 30 (Operation S2), and determines whether or not the transmission speed is greater than the speed on the receiving side (Operation S3). When the transmission speed is not greater than the speed on the receiving side, the processing returns to Operation S1.

When the transmission speed is greater than the speed on the receiving side, the speed on the receiving side is stored in the transmission speed storage unit 24a as a new transmission speed (Operation S4), and the new transmission speed is notified to the data transmission unit 22. The processing returns to Operation S1.

In this manner, the transmission unit 20 reflects the reception speed and the file write speed on the receiving side on the transmission speed, by determining the transmission speed based on the speed on the receiving side.

Figure 6:
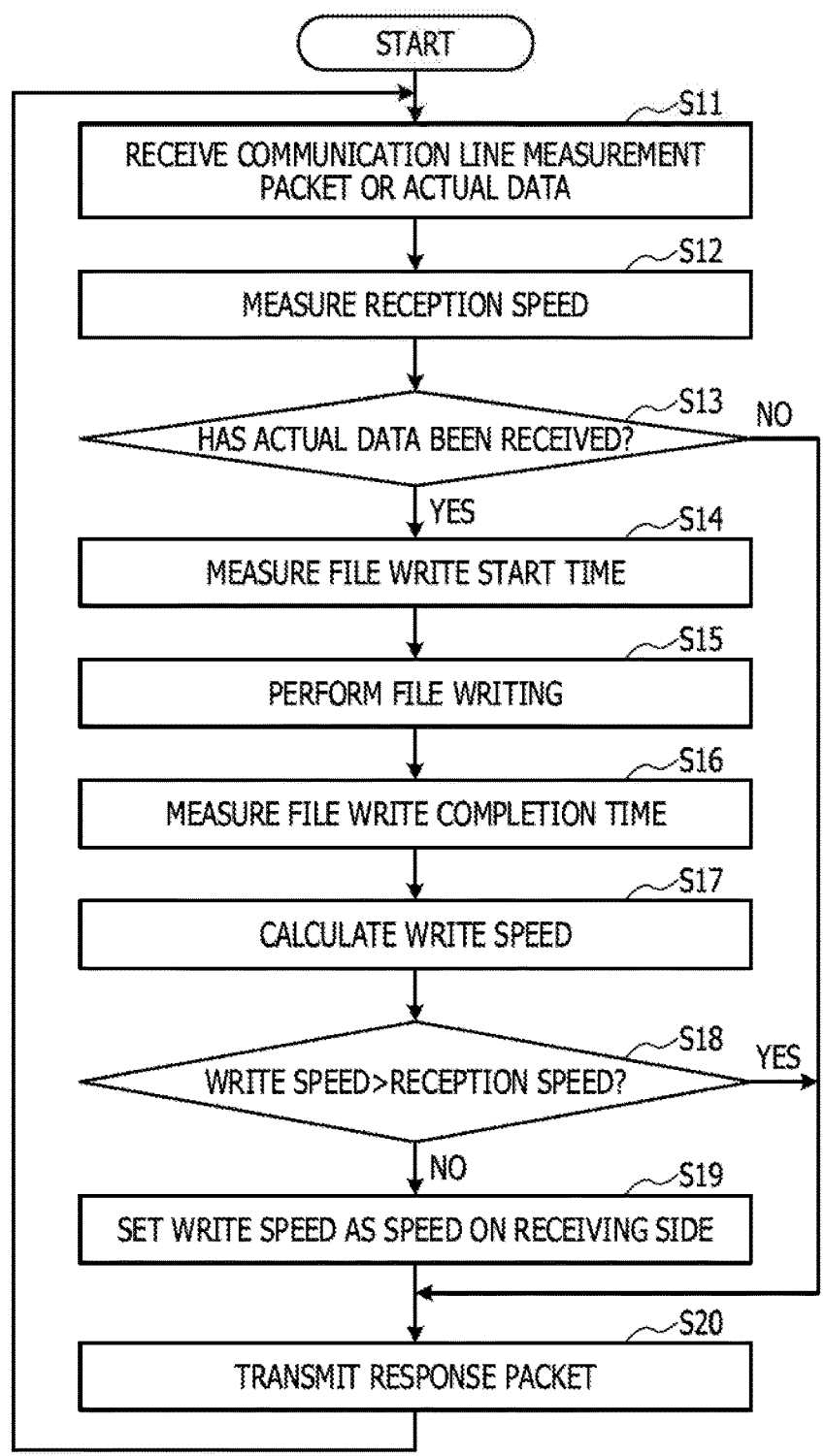
FIG. 6 illustrates an example of reception processing in a reception unit.

FIG. 6 illustrates an example of reception processing in a reception unit. The reception unit may be the reception unit 30 illustrated in FIG. 1. As illustrated in FIG. 6, the reception unit 30 receives a communication line measurement packet or actual data (Operation S11). The reception unit 30 measures the reception speed (Operation S12).

The reception unit 30 determines whether or not actual data has been received (Operation S13). When a communication line measurement packet instead of actual data has been received, the measured reception speed is set as the speed on the receiving side, and a response packet is transmitted (Operation S20). The processing returns to Operation S11.

When actual data has been received, the reception unit 30 measures file write start time (Operation S14) and performs file writing (Operation S15). The reception unit 30 measures file write completion time when the file writing is completed (Operation S16).

The reception unit 30 calculates "written data amount/(file write completion time-file write start time)" to obtain a write speed (Operation S17). The reception unit 30 determines whether or not the write speed is greater than the reception speed (Operation S18).

When the write speed is greater than the reception speed, the reception unit 30 sets the measured reception speed as the speed on the receiving side and transmits the response packet (Operation S20). The processing returns to Operation S11. When the write speed is not greater than the reception speed, the reception unit 30 sets the write speed as the speed on the receiving side (Operation S19) and transmits a response packet (Operation S20). The processing returns to Operation S11.

In this manner, when the write speed is not greater than the reception speed, the reception unit 30 transmits the response packet setting the write speed as the speed on the receiving side. Therefore, writing to a file may not become a bottleneck.

For example, the reception speed measurement unit 31a measures the reception speed of a packet. For example, the write speed measurement unit 32a measures a write time to a file and calculates a write speed from the write time and the written data amount. The obtaining unit 34a obtains the reception speed from the reception speed measurement unit 31a and obtains the write speed from the write speed measurement unit 32a. The determination unit 34b determines the speed on the receiving side based on the reception speed and the write speed that have been obtained by the obtaining unit 34a. The response transmission unit 33 generates a response packet based on the speed on the receiving side determined by the determination unit 34b, and transmits the response packet to the information processing device 2a.

The response reception unit 23 receives the response packet. The determination unit 24b compares the speed on the receiving side included in the response packet received from the response reception unit 23 with the transmission speed stored in the transmission speed storage unit 24a, and in cases in which the speed on the receiving side is lower than the transmission speed, determines the speed on the receiving side to be the new transmission speed.

In this manner, the information processing device 2a transmits data in a range in which the information processing device 2b is capable of processing data. Therefore, this may suppress a reduction in the data transfer speed due to transmission of data exceeding the processing capacity of the information processing device 2b.

The reception control unit 34 calculates and notifies to the response transmission unit 33 the speed on the receiving side of the network through which the data reception unit 31 received the packet. The response transmission unit 33 transmits the response packet including the speed on the receiving side of the network through which the data reception unit 31 received the packet, to the information processing device 2a.

When the determination unit 24b receives the response packet received through the SAN 3, from the response reception unit 23, the determination unit 24b determines a transmission speed in the SAN 3. When the determination unit 24b receives the response packet received through the LAN 4, from the response reception unit 23, the determination unit 24b determines a transmission speed in the LAN 4. The selection unit 24c selects the network through which a file is transferred, based on the transmission speeds respectively determined for the SAN 3 and the LAN 4 by the determination unit 24b, and notifies the data transmission unit 22 of the selected network. The data transmission unit 22 transmits data using the network notified from the selection unit 24c.

The information processing device 2a selectively uses the SAN 3 or the LAN 4 according to the circumstances, thus, data may be transmitted efficiently.

When the data transmission unit 22 transmits data using the SAN 3, plural files are transferred by a single logical connection. Therefore, the information processing device 2a transfers a number of files that exceed the number of logical connections.

For example, the processing of the above-described reception unit 30 may be achieved by causing an information generation program having a function similar thereto, to be executed by the information processing device 2b. The information processing device 2a may have a hardware configuration similar to that of the information processing device 2b. The processing of the above-described transmission unit 20 may be achieved by causing a software having a function similar thereto to be executed by the information processing device 2a.

Figure 7:
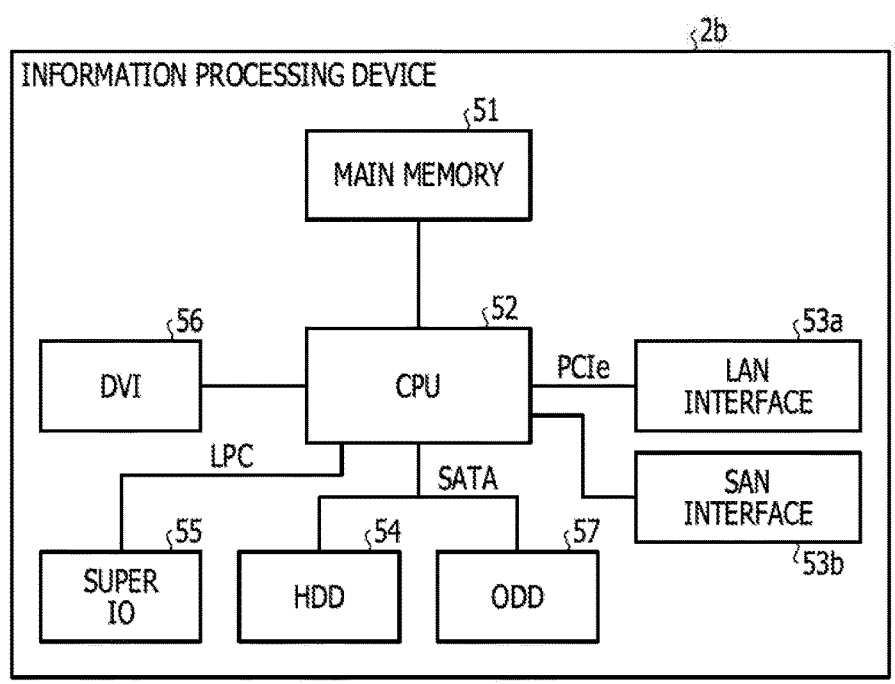
FIG. 7 illustrates an example of a hardware configuration of an information processing device.

FIG. 7 illustrates an example of a hardware configuration of the information processing device. As illustrated in FIG. 7, the information processing device 2b includes a main memory 51, a CPU 52, a LAN interface 53a, and a SAN interface 53b. The information processing device 2b further includes a HDD 54, a super input output (IQ) 55, a digital visual interface (DVI) 56, and an optical disk drive (ODD) 57.

The main memory 51 may be a memory that stores a program, an intermediate result of execution of a program, and the like. The CPU 52 may be a central processing device that reads a program from the main memory 51 and executes the program. The CPU 52 includes a chipset including a memory controller.

The LAN interface 53a may be an interface for connecting the information processing device 2b to another information processing device such as the information processing device 2a through the LAN 4. The SAN interface 53b may be an interface for connecting the information processing device 2b to another information processing device such as the information processing device 2a through the SAN 3. The HDD 54 may be a disk device that stores a program and data. The super IO 55 may be an interface for connecting input devices such as a mouse and a keyboard. The DVI 56 may be an interface for connecting a liquid crystal display device. The ODD 57 may be a device that reads from and writes to a digital versatile disc (DVD).

The LAN interface 53a is coupled to the CPU 52 through PCI express (PCIe), and the HDD 54 and the ODD 57 are coupled to the CPU 52 through serial advanced technology attachment (SATA). The super IO 55 is coupled to the CPU 52 through low pin count (LPC).

For example, the information generation program executed in the information processing device 2b is stored in a DVD, and is read from the DVD through the ODD 57 and installed to the information processing device 2b. For example, the information generation program is stored in a database and the like of another information processing device connected through the LAN interface 53a, and is read from the databases and installed to the information processing device 2b. The installed information generation program is stored in the HDD 54, read to the main memory 51, and executed by the CPU 52.

For example, the information processing device 2a and the information processing device 2b may be connected to each other through the SAN 3 and the LAN 4, or may be connected to each other through another network.

The information processing device 2b may write data to the HDD 54, or the information processing device 2b may write data to another storage device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information generation method comprising:
   calculating, by a reception device on a receiving side, for respective communication paths included in the communication paths, a write speed of data which is transmitted at a transmission speed from a transmission device on a transmitting side and is received through the respective communication paths at the reception device to a storage device in the reception device based on a write time of the data to the storage device and an amount of the data;
   measuring a reception speed of the data at the reception device;
   comparing the write speed with the reception speed;
   setting the write speed as a speed on the receiving side when the write speed is equal to or smaller than the reception speed and setting the reception speed as the speed on the receiving side when the write speed is greater than the reception speed;
   transmitting the speed on the receiving side to the transmission device with information which identifies the respective communication paths; and
   setting, at the transmission device, the speed on the receiving side as a new transmission speed when the transmission speed is greater than the speed on the receiving side.

2. The information generation method according to claim 1, further comprising:
   detecting whether the data is a measurement packet or actual data; and
   setting, when the data is the measurement packet, the reception speed as the speed on the receiving side without calculating the write speed.

3. The information generation method according to claim 1, further comprising:
   detecting whether the data is a measurement packet or actual data; and
   performing the calculating the write speed when the data is the actual data.

4. The information generation method according to claim 1, further comprising:
  measuring a write start time when starting a write of the data to the storage device;
  measuring a write completion time when completing the write of the data to the storage device; and
  calculating the write time by subtracting the write start time from the write completion time.

5. The information generation method according, to claim 1, further comprising:
  storing, at the transmission device, the transmission speed in a memory; and
  comparing, at the transmission device, the speed on the receiving side with the transmission speed which is stored in the memory.

6. The information generation method according to claim 1, wherein the write speed is measured by writing the data to a file.

7. The information generation method according to claim 1, wherein the transmission device selects a communication path for transmitting new data out of the plurality of communication paths, based on the speed on the receiving side and the information included in a response packet.

8. An information generation device comprising:
  a memory that stores a program; and
  a processor that executes the program to perform operations to:
    calculate, for respective communication paths included in the communication paths, a write speed of data which is transmitted at a transmission speed from a transmission device and is received through the respective communication paths at the information generation device on a receiving side to a storage device in the information generation device based on a write time of the data to the storage device and an amount of the data;
    measure a reception speed of the data at the information generation device;
    compare the write speed with the reception speed;
    set the write speed as a speed on the receiving side when the write speed is equal to or smaller than the reception speed and setting the reception speed as the speed on the receiving side when the write speed is greater than the reception speed; and
    transmit the speed on the receiving side the transmission device with information which identifies the respective communication paths,
  wherein the speed on the receiving side is set as a new transmission speed at the transmission device when the transmission speed is greater than the speed on the receiving side.

9. The information generation device according to claim 8, wherein the processor:
  detects whether the data is a measurement packet or actual data; and
  sets, when the data is the measurement packet, the reception speed as the speed on the receiving side without calculating the write speed.

10. The information generation device according to claim 8, wherein the processor:
  detects whether the data is a measurement packet or actual data; and
  performs the calculating the write speed when the data is the actual data.

11. The information generation device according to claim 8, wherein the processor:
  measures a write start time when starting a write of the data to the storage device;
  measures a write completion time when completing the write of the data to the storage device; and
  calculates the write time by subtracting the write start time from the write completion time.

12. The information generation device according to claim 8, wherein the transmission speed is stored in a memory at the transmission device, and the speed on the receiving side and the transmission speed which is stored in the memory are compared with each other at the transmission device.

13. The information generation device according to claim 8, wherein the write speed is measured by writing the data to a file.

14. The information generation device according to claim 8, wherein the transmission device selects a communication path for transmitting new data out of the plurality of communication paths, based on the speed on the receiving side and the information included in a response packet.

15. A non-transitory computer-readable recording medium for storing information generation program comprising:
  calculating, for respective communication paths included in the communication paths, a write speed of data which is transmitted at a transmission speed from a transmission device and is received through the respective communications path at a reception device on a receiving side to a storage device in the reception device based on a write time of the data to the storage device and an amount of the data;
  measuring a reception speed of the data at the reception device;
  comparing the write speed with the reception speed;
  setting the write speed as a speed on the receiving side when the write speed is equal to or smaller than the reception speed and setting the reception speed as the speed on the receiving side when the write speed is greater than the reception speed;
  transmitting the speed on the receiving side to the transmission device with information which identifies the respective communication paths; and
  setting, at the transmission device, the speed on the receiving side as a new transmission speed when the transmission speed is greater than the speed on the receiving side.

16. The non-transitory computer-readable recording medium according to claim 15, further comprising:
  detecting whether the data is a measurement packet or actual data; and
  setting, when the data is the measurement packet, the reception speed as the speed on the receiving side without calculating the write speed.

17. The non-transitory computer-readable recording medium according to claim 15, further comprising:
  detecting whether the data is a measurement packet or actual data; and
  performing the calculating the write speed when the data is the actual data.

18. The non-transitory computer-readable recording medium according to claim 15, further comprising:
  measuring a write start time when starting a write of the data to the storage device;
  measuring a write completion time when completing the write of the data to the storage device; and
  calculating the write time by subtracting the write start time from the write completion time.

19. The non-transitory computer-readable recording medium according to claim 15, further comprising:
    storing, at the transmission device, the transmission speed in a memory; and
    comparing, at the transmission device, the speed on the receiving side with the transmission speed which is stored in the memory.

20. The non-transitory computer-readable recording medium according to claim 15, wherein the write speed is measured by writing the data to a file.

* * * * *